(12) United States Patent
Maheshwari et al.

(10) Patent No.: US 8,184,561 B2
(45) Date of Patent: May 22, 2012

(54) TERMINAL BASED PACKET LOSS DUE TO MOBILITY DETECTION

(75) Inventors: Shashikant Maheshwari, Irving, TX (US); Khiem Le, Coppell, TX (US); Yogesh Swami, Irving, TX (US)

(73) Assignee: Nokia Corporation, Espoo (FI)

( * ) Notice: Subject to any disclaimer, the term of this patent is extended or adjusted under 35 U.S.C. 154(b) by 857 days.

(21) Appl. No.: 11/154,817

(22) Filed: Jun. 17, 2005

(65) Prior Publication Data

US 2006/0146695 A1 Jul. 6, 2006

Related U.S. Application Data

(60) Provisional application No. 60/637,739, filed on Dec. 22, 2004.

(51) Int. Cl.
*H04B 7/00* (2006.01)
*H04W 4/00* (2009.01)

(52) U.S. Cl. ..................... 370/310; 370/331

(58) Field of Classification Search .............. 370/310, 370/338, 465, 352, 474, 328, 248, 230, 235, 370/310.2, 331, 394; 455/67.11, 445, 423, 455/432.1, 436–442, 418–420
See application file for complete search history.

(56) References Cited

U.S. PATENT DOCUMENTS

| | | | |
|---|---|---|---|
| 5,912,878 A * | 6/1999 | Park et al. ................. | 370/229 |
| 5,974,028 A * | 10/1999 | Ramakrishnan ............ | 370/229 |
| 6,757,248 B1 | 6/2004 | Li et al. | |
| 6,961,327 B2 * | 11/2005 | Niu ............................ | 370/338 |
| 6,975,591 B1 * | 12/2005 | Shorey et al. ............... | 370/229 |
| 7,061,936 B2 * | 6/2006 | Yoshimura et al. .......... | 370/474 |
| 7,177,272 B2 * | 2/2007 | Swami ........................ | 370/229 |
| 7,263,067 B2 * | 8/2007 | Sreemanthula et al. ..... | 370/236 |
| 7,304,948 B1 * | 12/2007 | Ong ........................... | 370/230.1 |
| 7,356,335 B2 * | 4/2008 | Akiyama ..................... | 455/424 |
| 7,366,096 B2 * | 4/2008 | Swami ........................ | 370/231 |
| 2002/0141353 A1 * | 10/2002 | Ludwig et al. .............. | 370/254 |
| 2002/0141448 A1 * | 10/2002 | Matsunaga .................. | 370/469 |
| 2002/0186660 A1 * | 12/2002 | Bahadiroglu ................ | 370/248 |
| 2003/0120796 A1 * | 6/2003 | Shin ............................ | 709/235 |
| 2003/0161326 A1 * | 8/2003 | Pazhyannur et al. ..... | 370/395.52 |
| 2004/0047343 A1 * | 3/2004 | Muniere ...................... | 370/352 |
| 2005/0002412 A1 * | 1/2005 | Sagfors et al. .............. | 370/437 |

(Continued)

FOREIGN PATENT DOCUMENTS

WO WO 00/21321 4/2000

(Continued)

OTHER PUBLICATIONS

Hari Balakrishnan, et al. (IEEE—XP-000734405), "A Comparison of Mechanisms for Improving TCP Performance over Wireless Links", Dec. 1997, pp. 756-769.

(Continued)

*Primary Examiner* — Brandon Miller
(74) *Attorney, Agent, or Firm* — Alston & Bird LLP

(57) ABSTRACT

The invention proposes a method for controlling a packet transmission between a sender and a receiver sent via a packet transport protocol, the receiver being a mobile network element, comprising the steps of detecting whether a mobility event has occurred, detecting whether a downlink packet loss has occurred, and providing, in case a mobility event and a packet loss has been detected, an indication to the sender that a packet loss due to mobility has occurred.

27 Claims, 5 Drawing Sheets

U.S. PATENT DOCUMENTS

2005/0021821 A1* 1/2005 Turnbull et al. .............. 709/232

FOREIGN PATENT DOCUMENTS

WO    WO 2004/074969    9/2004

OTHER PUBLICATIONS

International Search Report for PCT/IB2005/003637 dated Jun. 12, 2006.

E. Blanton et al., Request for Comment, "A Conservative Selective Acknowledgement (SACK)—based Loss Recovery Algorithm for TCP," Apr. 2003.
S. Floyd et al., Request for Comment, "The NewReno Modification to TCP's Fast Recovery Algorithm," Apr. 1999.
Swami et al., Request for Comment, "Lightweight Mobility Detection and Response (LMDR) Algorithm for TCP," Mar. 2004.

\* cited by examiner

TERMINAL BASED PACKET LOSS DUE TO MOBILITY DETECTION

BACKGROUND OF THE INVENTION

1. Field of the Invention

The invention relates to a method for controlling a packet transmission between a sender and a mobile receiver, and a mobile network element.

2. Description of the Related Art

This invention is related to wireless and packet transport protocols such as TCP (Transport Control Protocol). TCP was designed under the assumption that the end-to-end path of a TCP connection does not change during a session and therefore the congestion control algorithms are triggered solely on packet loss or timeout information. In wireless networks, the user moves from one cell to another, which triggers different types of mobility events (e.g., cell updates or RA (Routing Area) updates). In this connection, it is noted that in packet switched networks (like GPRS (General Packet Radio Service) or EGPRS (Enhanced GPRS)), if the mobile is in data transfer mode and moves out of range of current cell, connection in current cell is terminated and re-established in the new cell. Before re-establishing connection in a new cell, a mobile station in general does a cell reselection and selects a new cell, this new cell may belong to same RA or different RA. If it belongs to same RA, the mobile station will do the cell update otherwise it will do the RA update.

Downlink packets are lost during some types of mobility events. For example, in an EGPRS (also referred to as EDGE (Enhanced Data Rates for GSM Evolution)) network, downlink LLC PDUs (Logical Link Control Packet Data Units) in UNACK mode (i.e., in a mode in which no acknowledgement messages or the like are sent) are lost during Inter-BSC RA (Inter Base Station Controller Routing Area) update or Inter-SGSN (Serving GPRS Support Node) RA update, etc. This leads to the fact that the design assumption of TCP does not holds good in wireless environments.

TCP dynamically calculates the end-to-end network capacity in order to avoid packet loss due to buffer overflow. TCP assumes packet loss in the network as an indication of congestion in the network. This assumption holds good in wire-line network, but in wireless networks, there are events not related to network congestion, which cause data loss. These events include some handoff procedures. When such handoff-induced losses occur, it is anti-optimal to wait for the TCP sender to time-out (as is the case currently with TCP).

SUMMARY OF THE INVENTION

Hence, it is an object of the present invention to solve the problem mentioned above and to enable are more reliable usage of a transport protocol such as TCP.

This object is solved by a method for controlling a packet transmission between a sender and a receiver sent via a packet transport protocol, the receiver being a mobile network element, comprising the steps of
  detecting whether a mobility event has occurred,
  detecting whether a downlink packet loss has occurred, and
  providing, in case a mobility event and a packet loss has been detected, an indication to the sender that a packet loss due to mobility has occurred.

Alternatively, the above object is solved by a mobile network element comprising
  a receiving means for receiving packets sent via a packet transport protocol,
  a mobility detecting means for detecting whether a mobility event has occurred,
  a packet loss detecting means for detecting whether a downlink packet loss has occurred, and
  an indication providing means for providing, in case a mobility event and a packet loss has been detected, an indication to the sender that a packet loss due to mobility has occurred.

As a further alternative, the above object is solved by a computer program embodied on a computer readable medium, the computer program being configured to control a processor to perform the steps of a method for controlling a packet transmission between a sender and a receiver sent via a packet transport protocol, the receiver being a mobile network element, comprising the steps of
  detecting whether a mobility event has occurred,
  detecting whether a downlink packet loss has occurred, and
  providing, in case a mobility event and a packet loss has been detected, an indication to the sender that a packet loss due to mobility has occurred.

Namely, according to the present invention, it is detected whether a packet loss is caused due to mobility, and this is indicated to the sender, so that on the sender side, corresponding adjustment algorithms can be triggered.

That is, according to the invention, it is differentiated between a congestion-caused packet loss (which can be handled by conventional TCP congestion control, for example) and mobility-caused packet loss, which requires a different handling.

Further advantageous developments are set out in the dependent claims.

BRIEF DESCRIPTION OF THE DRAWINGS

The invention is described by referring to the enclosed drawings, in which.

DETAILED DESCRIPTION OF THE PREFERRED EMBODIMENTS

In the following, preferred embodiments of the present invention are described by referring to the attached drawings.

As mentioned above, according to the present invention, a packet loss due to mobility detection (also referred to as mobility/packet loss detection or MPLD) is performed at the terminal side, since TCP (Transport Control Protocol) (as one example for a packet transport protocol) assumes packet loss in the network as an indication of congestion in the network and performs procedures to avoid the congestion. For example, TCP waits for the TCP sender to time-out, which would lead to a decrease of the throughput of packets. Thus, according to the invention, the TCP sender behaviour is modified so that it retransmits right away. This is achieved by notifying the sender that the "data loss was caused by mobility".

In the following, an EGPRS network is considered as an example. However, similar scenarios exist in other wireless technologies. Data loss can also happen during handoff between cellular and non-cellular (e.g. WLAN (Wireless Local Area Network)). In EGPRS network, mobility events after cell reselection could be one of the following:

Intra BSC (Base Station Controller) cell update
Intra BSC RA (Routing Area) update
Inter BSC cell update
Inter BSC RA update
Inter SGSN (Serving GPRS Gateway Node) RA update It is normal behaviour that TCP traffic will be transported over UNACK LLC (UNACKnowledged Logical Link Control) mode in case of EGPRS network and unreliable underlying logical link in case of other wireless networks.

In EGPRS network, due to user mobility, downlink LLC PDUs (Packet Data Units) in UNACK mode may be lost in most of these cases (SGSN flushes the UNACK LLC PDUs in the old RA and/or old BSC), which results in the outage at the transport layer (TCP). Experimentation with the EGPRS emulator tested has shown that the outage duration can be quite significant (refer to FIG. 5 and FIG. 6).

This invention describes a terminal based scheme by which packet loss after mobility can be detected at the terminal. The information is provided to the TCP sender such that it can be used by the transport layer (TCP) to provide an indication to the sender to improve the throughput of the affected connection.

Figure 1:
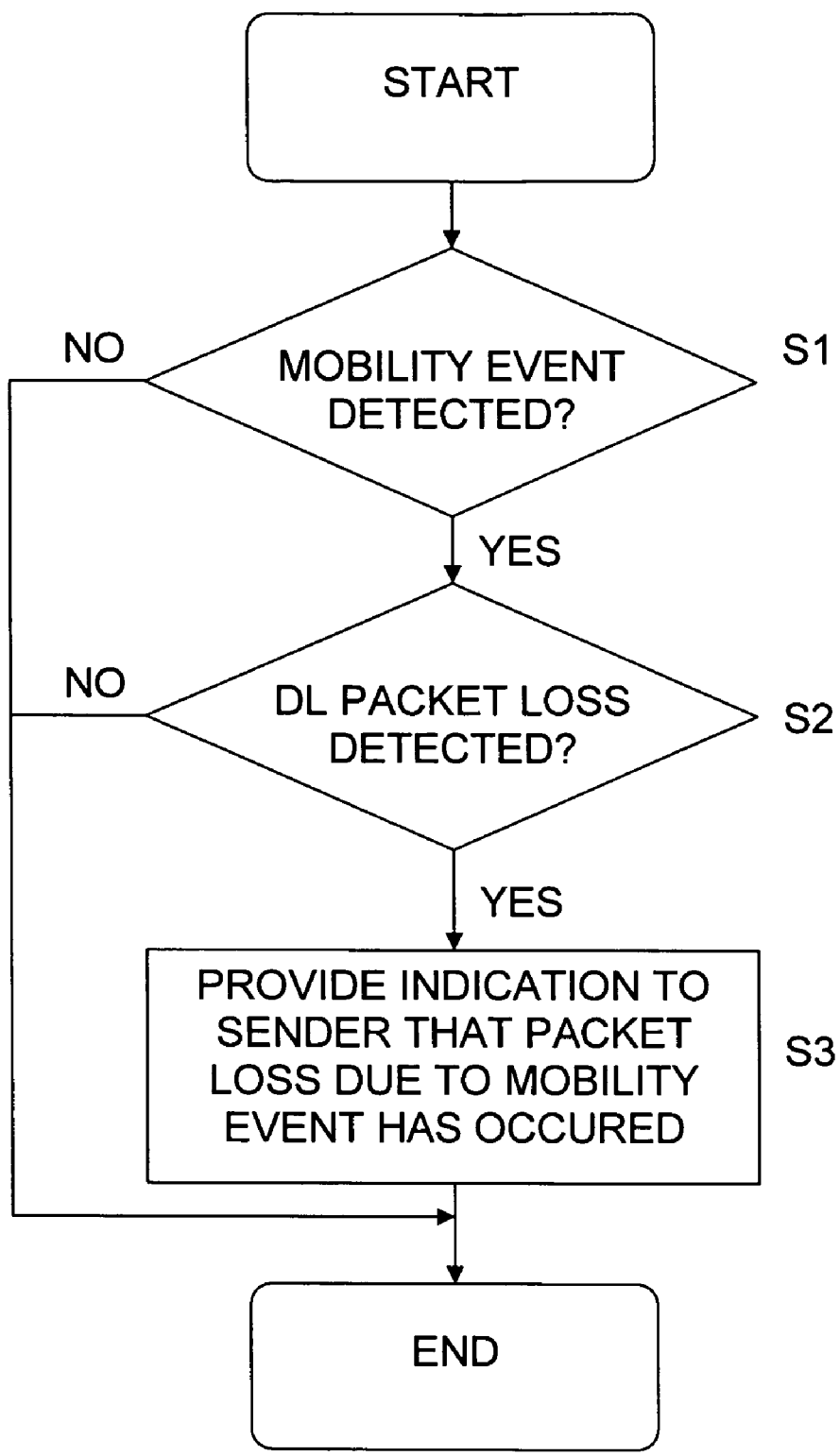
FIG. 1 shows a procedure for detecting packet loss due to mobility according to a first embodiment of the invention.

The principle procedure according to the present embodiment is illustrated in the flowchart of FIG. 1. In step S1, it is detected whether a mobility event has occurred (e.g., whether a cell update or an RA update is performed). If this is the case (YES), then it is detected in step S2 whether there is a downlink (DL) packet loss. If this is also true (YES), then it can be determined that indeed a packet loss due to mobility has occurred. Hence, this is indicated to the sender in step S3. In case no mobility event occurred (NO in step S1) or no packet loss is detected (NO in step S2), the procedure is ended without providing an indication to the sender.

Figure 2:
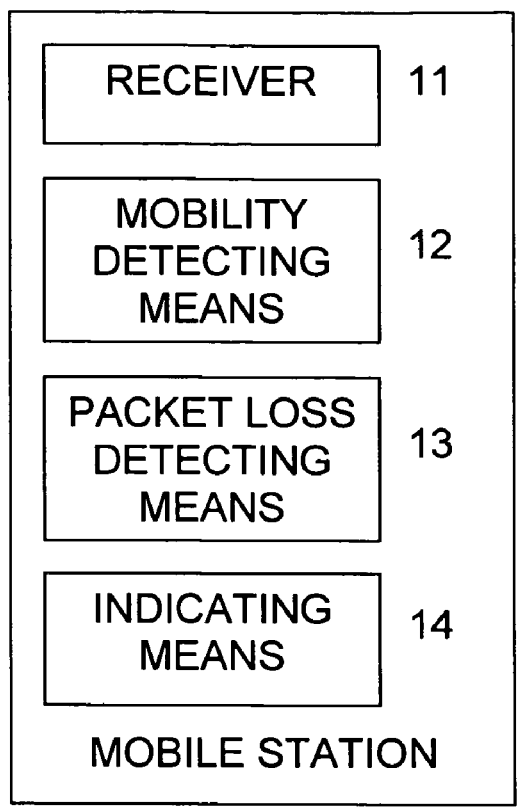
FIG. 2 shows a basic structure of a mobile station according to the first embodiment of the invention.

FIG. 2 shows a mobile station as an example for a mobile network element according to the present embodiment. The mobile station comprises a receiver 11, which receives packets sent via a TCP as an example for a packet transport protocol. Furthermore, the mobile station comprises a mobility detecting means 12 for detecting whether a mobility event has occurred, a packet loss detecting means for detecting whether a downlink packet loss has occurred, and an indicating means 14. The indicating means serves to provide an indication to the sender that a packet loss due to mobility has occurred, in case a mobility event and a packet loss has been detected (similar to step S3 described above).

It is noted that upon implementing the mobile station according to the present embodiment as illustrated in FIG. 2, the mobility detecting means 12, the packet loss detecting means 13 and the indicating means 14 may be implemented as one processing means, which can also perform further functions, for example.

In the following, the procedure according to the present embodiment is described in more detail. As mentioned above, according to the present embodiment of the invention, packet loss due to mobility is detected at the terminal side. This is accomplished by detecting that the lower layer protocol in the terminal side is timeout waiting to reassemble higher layer PDU and at the same time there is handoff, then it is safe to say that downlink packets are lost due to mobility and this information can be provided to TCP. TCP will use this information to improve the throughput of the connections. For example, In EGPRS network, if Radio Link Control/Medium Access Control (RLC/MAC) is timeout waiting to reassemble LLC UNACK PDU and at the same side there is mobility event, it is safe to say that downlink packets are lost due to mobility.

As an alternative to the first embodiment, the packet loss due to mobility detection may be implemented in the LLC layer. When out of sequence LLC UNACK PDU received and at the same time there was mobility event, it is safe to declare that downlink packets are lost due to mobility.

The Terminal based mobility/packet loss detection scheme according to the present embodiment has two parts:

Mobility detection
Packet loss detection

In the following, the scheme is described in more detail.
Mobility Detection:

In the cellular network, a mobile terminal moves from one cell to another, which results in cell update or RA update. Terminal mobility can be detected by cell change and/or RA change by identifying the relevant parameters change on broadcasted system information or cell parameters provided by the network or cell change indication provided by upper layers.

However, the terminal does not know whether this cell update/RA update results in the change of BSC or 2G-3G core network elements. This change of BSC or 2G-3G core network element may result in a downlink packet loss.
Packet Loss Detection:

After a mobility event in the cellular network, if terminal is not able to reconstruct the upper layer PDU within some threshold time, or out of sequence PDUs are received by the terminal, then terminal can certainly detect that downlink packets are lost after mobility. This information can be provided to the transport layer (TCP), which can be used by the transport layer to improve the throughput performance of the TCP connection.

The threshold time is based on cellular technology. In EGPRS, the threshold time is calculated based on cell update signalling time+DL TBF setup Time (DL TBF=Downlink Temporary Block Flow).

As an example, this detection scheme at the terminal side can be used with a so-called Lightweight Mobility Detection And Response (LMDR) method to be described in the following to improve the throughput performance of the TCP connection. This LMDR method is described in detail in WO2004/074969, and can be summarized as follows:

According to the LMDR method, a so called Mobility (M) flag is implemented an the TCP header. This M flag indicates whether a TCP receiver is still in the same subnet as before. When the TCP receiver moves from one subnet to another (i.e., performs a cell update and/or RA update), it toggles the M flag and uses the new value of M as long as the TCP receiver stays in the new subnet. On the other hand, the TCP sender maintains a state indicating the last value of M from the receiver. If the incoming acknowledge signals (ACKs) have the same M flag, the sender concludes that the receiver is still in the same subnet. If the value of the M flag changes, the sender concludes that the receiver has changed subnets. The M flag may be implemented using one or more bits. In case of using only one bit, toggling of the M flag can be performed by toggling the corresponding bit.

Thus, when the TCP sender concludes that the TCO receiver has changed subnets, the TCP sender can immediately start a recovery algorithm.

In the following, the scheme of the present embodiment is described in more detail.

As described above, according to the present embodiment, a downlink packet loss after mobility is detected on the terminal side, and this is indicated to TCP or any other layer. TCP can use this information to improve the throughput of the connection. Here we will describe the one possible implementation for EGPRS network. However, a similar approach can be applied to other wireless network in order to detect the packet loss in the downlink after mobility.

Figure 3:
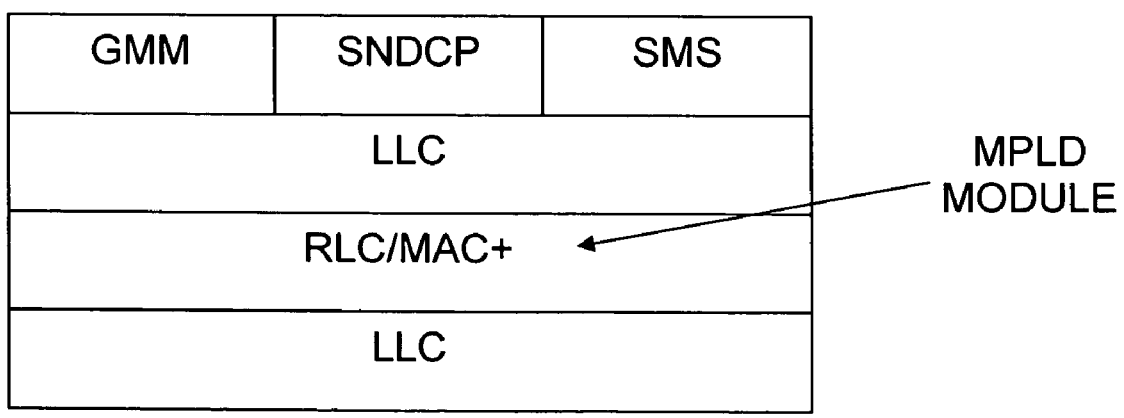
FIG. 3 shows a reference example implementation of the packet loss due to mobility detection module according to the first embodiment of the invention.

FIG. 3 shows an excerpt of the protocol stack of EGPRS on the Terminal side. The lowest layer (L1) represents the Radio Function (RF). The next layer is the Radio Link Control/Medium Access Control (RLC/MAC) layer, the next layer is the Logical Link Control (LLC) layer, and the upper layer (in the illustration of FIG. 2) comprises GPRS Mobility Management (GMM), Sub-Network Convergence Protocol (SNDCP) and Short Messages Service (SMS). "Mobility/packet loss detection" module (also refer as MPLD module) can be implemented inside or outside of the protocol stack. In FIG. 2, it is implemented inside of RLC/MAC layer. Downlink packet loss is possible in particular if LLC UNACK mode is used for data transfer. Therefore this scheme is useful in case the LLC UNACK mode is used for data transfer. It is expected that most of the TCP traffic will go through LLC UNACK mode so this is the normal behaviour. Similar situation is true for other wireless technologies.

Following is the detailed specification of this scheme.
Mobility/Packet Loss Detection:

Mobility detection can be done at various places in the protocol stack as most of the link layers like GMM, LLC, RLC/MAC are aware of cell reselection. When a mobile user moves from one cell to another, this triggers a cell reselection. Cell reselection results in either a cell update or a RA (Routing Area) update.

Four new variables are required in the MPLD module in order to implement Mobility/Packet loss detection.

Cell_flag
Subnet_change_flag
Out_of_sequence_data recvd
Threshold_timer

The cell_flag and the subnet_change_flag indicate a mobility event. The cell_flag is set (i.e., assumes the value 1) in case the cell has changed, and the subnet_change_flag is set in case the subnet has changed. Otherwise, the flags are reset (i.e., 0). The Out_of_sequence_data_recd flag and the threshold timer are used to indicate a packet loss. The Out_of_sequence_data_recvd is set in case packets are received which are out of the sequence order. The threshold timer is used for detecting whether packets are lost.

These variables and their use according to the present embodiment are described in the following in more detail. The procedures according to the embodiment are described by using a format similar to the C computer program language.

In case of RA update, if LLC UNACK mode was used for data transfer, (i.e., in the specific case there is an RA update and at the same time the LLC UNACK mode is used) downlink data will be lost in any case therefore there is no need to wait for any threshold time to determine the packet loss. The "mobility/packet loss detection" module according to the embodiment will set the cell_flag to 1 and reset all other variables. Upon completion of the RA update procedure, MPLD will send the subnet change indication to transport layer (TCP). TCP will use this information along with LMDR to improve the throughput of the connection.

At RLC/MAC Layer:
Following code should be called when the terminal detects the RA change.

```
If(RA change AND
    LLC UNACK mode used ) {
    Cell_flag = 1;
    Reset all other variables;
}
```

Following piece of code is called when RA update signalling is complete. Since RA update results in downlink packet loss in case of LLC UNACK mode, the terminal can indicate the subnet change immediately to TCP.

```
if(RA update signalling complete AND cell_flag ==1) {
    Subnet_change_flag = 1;
    Indicate subnet change to TCP;
}
```

In case of a cell update, downlink data may be or may not be lost. In order to determine whether the downlink data is lost or not, the following exemplary algorithm can be used.

Cell_flag variable is set and all other variables are reset, when normal cell update is triggered while DL TBF is established and LLC UNACK mode is used for data transfer.

At RLC/MAC Layer:

```
If(normal cell change AND
    DL TBF established AND
    LLC UNACK mode used) {
    Cell_flag = 1;
    Subnet_change_flag = 0;
    Out_of_sequence_data_recvd = 0;
}
```

When cell update signalling is finished, Theshold_timer is started by the RLC/MAC.

```
If(cell update finished) {
    Start_timer( Threshold_timer);
}
```

When a packet loss occurs, two possible events can happen, either downlink data is received out of sequence or the Threshold_timer expires.
Downlink Packet Received:

```
If( cell_flag == 1 AND out of sequence packet
    received) {
    Out_of_sequence_data_recvd = 1;
}
```

Threshold Timer Expires:

```
ITimeout(Threshold_timer) {
If(out_of_sequence_data_recvd == 1 OR
    Partial LLC UNACK PDU left in the RLC buffer) {
```

```
    Subnet_change_flag = 1;
    Cell_flag = 0;
    Out_of_sequence_data_recvd = 0;
    Indicate subnet change to TCP or any other layer;
}
```

Hence, in this way it is detected whether a packet loss has occurred due to mobility, and this is indicated to TCP.

Next, the indication of this information to the sender is described. According to the present embodiment, the Lightweigt Mobility Detection and Response (LMDR) algorithm mentioned above and described in detail in WO2004/074969, for example, is used.

Figure 4A:
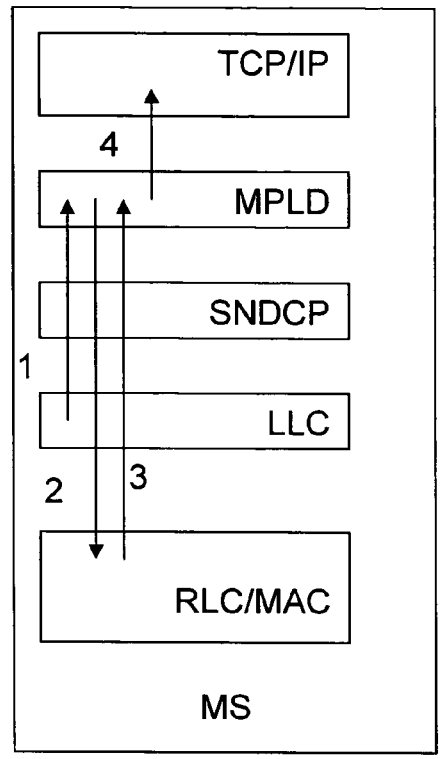
FIG. 4A shows a protocol stack in the mobile station according to the first embodiment of the invention.
Figure 4B:
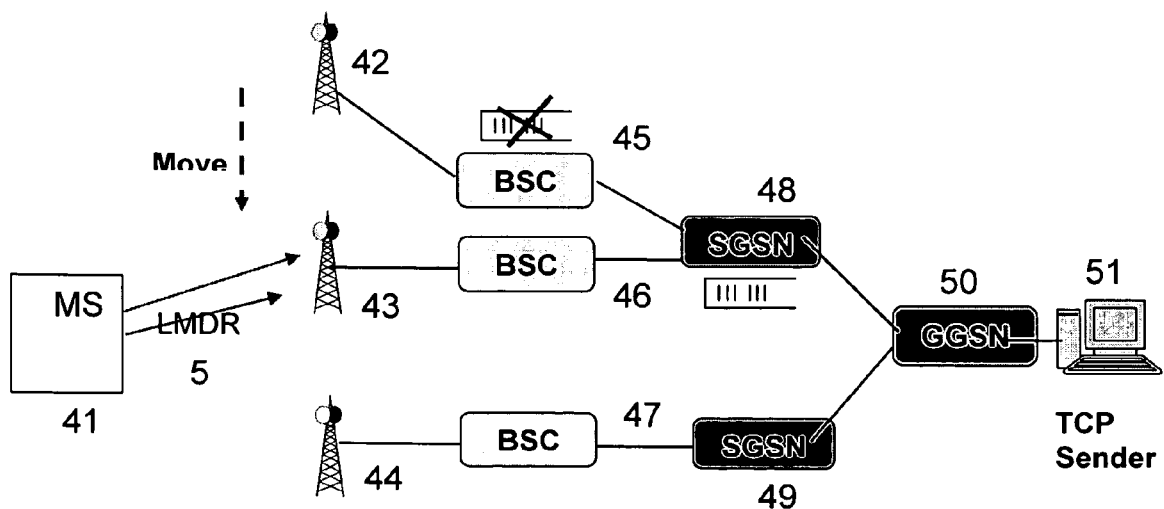
FIG. 4B shows the structure of the general network environment according to the first embodiment of the invention.

The procedure according to the first embodiment is described in more detail by referring to FIGS. 4A and 4B.

FIG. 4A illustrates the protocol stack in the mobile station, wherein the arrows with numbers indicate signal flows between the different protocol layers described above. FIG. 4B illustrates the network situation, wherein in the upper half cell update is shown (i.e., a change or movement between two BSCs, connected to BTSs, which both are connected to the same SGSN), and the lower half shows a RA update (i.e., a change or movement between two BSCs connected to BTSs, wherein each BSC is connected to a different SGSN). The two SGSN are connected to a GGSN, to which a TCP sender is connected.

When a mobile station moves from one BTS (BSC) to another, there are two possible cases, as described above, namely 1) RA case and 2) cell update cases. Both cases are described in the following.

1) Cell Update Case

The signalling between the layers in the mobile station MS is shown in FIG. 4. Namely, in signal flow 1, the LLC layer informs the MPLD module about a cell update. In signal flows 2 and 3, the MPLD module detects a downlink (DL) packet loss using the algorithm according to the present embodiment. In signal flow 4, the MPLD module sends an indication (e.g. using ICMP message) to the TCP/IP layer, and in signal flow 5 (FIG. 4B), the TCP/IP layer sends an LMDR indication to the TCP sender.

2) RA Case

In signal flow 1, the LLC layer informs the MPLD module according to the present embodiment about a RA update. It is noted that in contrast to the cell update case described above, the MPLD module does not require the signal flows 2 and 3 as RA update results in downlink packet loss. Hence, the next signal flow is signal flow 4, in which the MPLD module will indicate the DL packet loss to the TCP via, e.g., ICMP (Internet Control Message Protocol) signalling. Then, in signal flow 5 (FIG. 4B), the TCP/IP will send an LMDR indication to the TCP sender.

Figure 5:
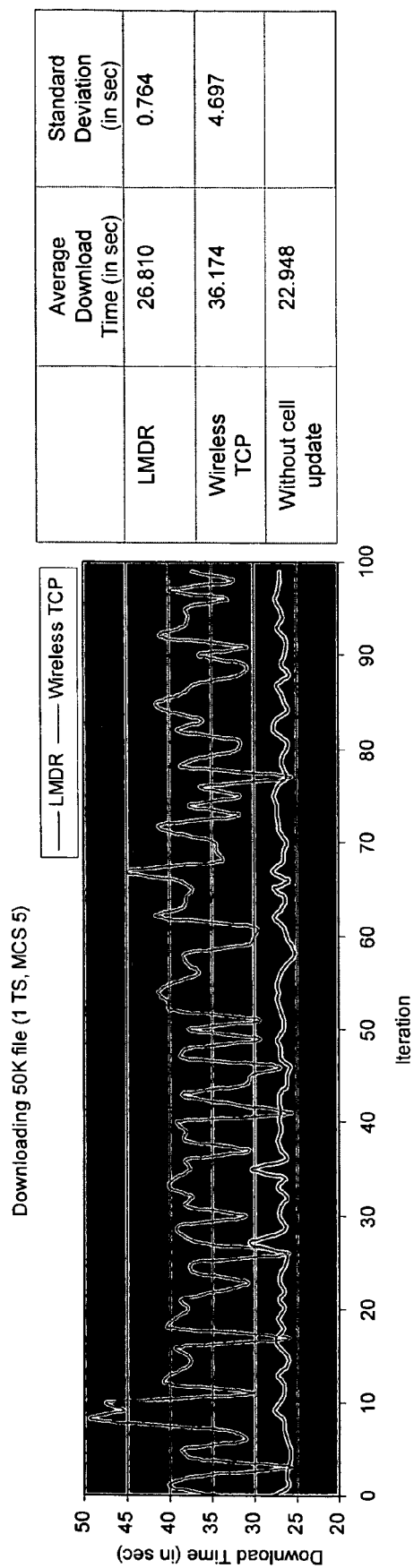
FIG. 5 shows a reference example of a network based packet loss due to mobility detection.
Figure 6:
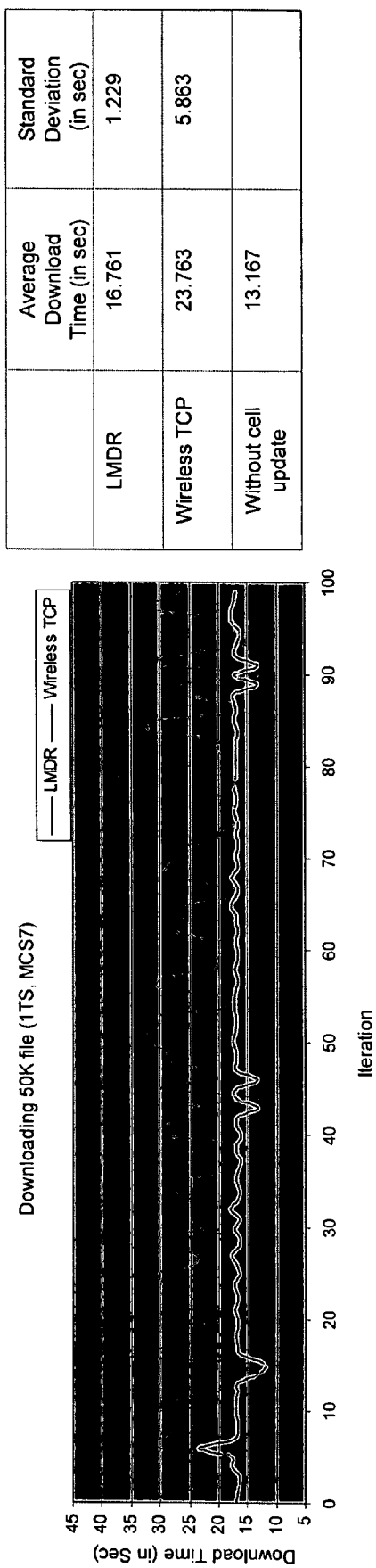
FIG. 6 shows a further reference example of a network based packet loss due to mobility detection.

In FIGS. 5 and 6, as reference examples, some experimental results of a network based mobility/packet loss detection are shown.

In detail, FIG. 5 shows an Intra-BSC RUP in EGPRS network (Network based mobility/packet loss detection) presents the test results obtained when network based mobility/packet loss detection algorithm was implemented along with the LMDR. In detail, FIG. 5 shows the results of the performance improvement with LMDR over Wireless TCP.

The test conditions were as follows:
1. Network setup: 2 BTS (2 cells) under 1 BSC and 1 SGSN but belonging to different routing area
2. Capacity of each cell: 1 Timeslot and MCS 5 coding scheme
3. downloading 50K files (100 iterations)
4. No errors
5. Cell update is triggered at random period during the file download.
6. Cell update period was synchronized for both the cases (LMDR and Wireless TCP)

As derivable, in terms of download time, a performance improvement of 25.88% (9.364 sec) can be achieved (in comparison to Wireless TCP with a cell update).

This network based mobility/packet loss detection schemes requires changes in SGSN and GGSN in case of EGPRS network. This result shows that the significant improvement in terms of download time is achieved with this scheme. It is expected that Terminal based mobility/packet loss detection presented in this invention report is going to provide the similar kind of performance improvement.

FIG. 6 shows an Inter-SGSN RUP in EGPRS network (Network based mobility/packet loss detection) presents the test results obtained when network based mobility/packet loss detection algorithm was implemented along with [LMDR]. In detail, shows a further example for the results of the performance improvement with LMDR over Wireless TCP, wherein the test conditions differ from that according to FIG. 6, as described in the following:
1. Network setup: 2 BTS (2 cells) under 1 BSC and 1 SGSN but belonging to different routing area
2. Capacity of each cell: 1 Timeslot and MCS 5 coding scheme
3. downloading 50K files (100 iterations)
4. No errors
5. Cell update is triggered at random period during the file download.
6. Cell update period was synchronized for both the cases (LMDR and Wireless TCP)

In the example of FIG. 6, the performance improvement in terms of download time with LMDR is 29.46% (7.002 sec).

This network based mobility/packet loss detection schemes requires changes in SGSN and GGSN in case of EGPRS network. This result shows that the significant improvement in terms of download time is achieved with this scheme. It is expected that Terminal based mobility/packet loss detection presented in this invention report is going to provide the similar kind of performance improvement.

In the following, a second embodiment of the present invention is described. The second embodiment is the same as the first embodiment with the exception of the manner how the indication regarding an occurrence of a packet loss due to mobility is provided to the sender. Namely, according to the second embodiment a multiple duplicate ACK algorithm is used.

That is, according to the second embodiment, the throughput performance of the TCP connection is improved such that when Mobile terminal detects the data loss due to mobility in the downlink direction, the TCP receiver can sends multiple duplicate ACKs in the uplink direction. Upon receiving multiple duplicate ACKs, TCP sender can begin the loss-recovery much sooner, instead of waiting for RTO (Retransmission Time Out).

Thus, according to the second embodiment, the TCP receiver can send a selected number of duplicate ACKs to recover the lost packets in congestion avoidance mode. The principle of sending duplicate ACKs is described, for example, in WO 03/088609 A2. The difference from LMDR as used in the first embodiment is that congestion avoidance can only recover one packet every round trip time, and if the congestion window of the sender is big, then recovering packets in congestion avoidance will take more time than waiting for an RTO and then recovering packets in slow start. Moreover, the scheme depends upon which congestion control algorithm is implemented in the TCP sender. The three flavors of congestion control in the present Internet are:
TCP Reno (RFC 2581. Standard Track)
TCP NewReno (RFC 2582. Experimental. Under IESG review for standards track)
TCP with SACK enhancement (RFC 3517. Standards Track.)
(Please note that although NewReno is still experimental and while SACK enhanced TCP is standards track protocol, there more NewReno implementation on the Internet than SACK enhanced version.)

In order that the duplicate ACK algorithm is effective, the TCP receiver must determine whether it is useful to initiate sending duplicate ACK or whether it is more useful to let the sender timeout. The excel sheet describes the threshold values on congestion window beyond which duplicate ACK is not useful.

The following algorithm describes a mechanism of determining if sending duplicate ACK should be processed or not.
1. When TCP receiver detects packet loss due to mobility, it should send N_th duplicate ACKs, where N_th is a configuration parameter that is determined through experiments. N_th is the an estimated upper bound on the number of ACKs needed for a TCP implementation to send one new data packet from outside of it's congestion window. For example, if N_max is the maximum estimated congestion window for which sending duplicate ACK is still better than a timeout, then the receiver need to send N_max−1 duplicate ACKs before the sender can send a new data packet which is outside of the sender's congestion window. (Please see the attached excel sheet with chart named "Reno," entry G10, in which the sender sends a new segment after receiving 9 duplicate ACKs.) If N_max was 10, as in this example, then the receiver should send N_max-1 duplicate ACKs.
2. After sending N_max−1 duplicate ACKs, the receiver may or may not receive a new packet. If the receiver does not receive a new packet, it means that the sender's congestion was too big for smart M-bit to have any benefits. If the receiver sees a new packet, then the receiver has already initiated the smart M-bit process and does not need to anything new. Please note that in case of RENO, this scheme may timeout after recovering the first packet, however, since there is no way to determine if a sender is implementing RENO or NewReno, this algorithm is the safest approach.

Hence, according to the embodiments described, above, the TCP's throughput can improved, in particular when used with the LMDR algorithm or the duplicate ACK algorithm.

Furthermore, according to the embodiments, a compact solution is achieved. Namely, the terminal based solution of mobility/packet loss detection does not require any support from the network side. Only the TCP sender behaviour at server is upgraded in case of LMDR (when using the LMDR algorithm as described in connection with the first embodiment).

Since the proposed solution does not require network support, it works over a variety of wireless technologies and even across technologies, e.g. handoff between different cellular or between cellular and non-cellular.

The invention is not limited to the embodiments described above, and various modification are possible.

For example, the embodiments may be freely combined. That is, a mobile network element (i.e., a terminal) may support both algorithms as described in the first and the second embodiment, and it may select one of these depending on the circumstances, for example, whether the sender also supports the LMDR algorithm or not.

Furthermore, it is noted that EDGE is only an example for a network in which the present invention can be applied. However, the invention can be applied to any packet communication network in which packet loss in connection with mobility may occur.

Moreover, also TCP is only an example for a transport protocol. The invention can also be applied to other kind of transport protocols (e.g., Stream Control Transmission Protocol (SCTP)) in which some kind of congestion control or the like is applied by which delivery of packets is inhibited or the rate thereof is decreased.

Furthermore, the mobile terminal described in the embodiments is only an example for a mobile network element, which can be any kind of equipment which can be subjected to mobility events, i.e., can change their point of attachment to the corresponding network.

In the above-described embodiments, a fixed sender (which does not change address and/or point of attachment to the network) was described. However, also the sender can be a mobile network element in the sense as described above.

It is further noted that some or all above-described functions may be performed by a computer program product that comprises a computer-readable medium on which software code portions are stored e.g. by using a central processing unit of the network element 100 with a dedicated storage means.

The invention claimed is:

1. A method, comprising:
    detecting, by a processor, whether a mobility event has occurred during a packet transfer involving packets being sent from a sender of the packets to a mobile network element;
    detecting whether a downlink packet loss has occurred during the packet transfer, which includes detecting whether the mobile network element is able to reconstruct a protocol data unit within a predetermined time; and
    directing transmission, from an indication provider of the mobile network element to the sender of the packets, of an indication that a packet loss due to mobility has occurred in an instance in which the mobility event is detected and the downlink packet loss is detected, wherein the indication of the occurrence of the downlink packet loss due to mobility enables a packet recovery algorithm to be started in response to receiving of the indication.

2. The method according to claim 1, wherein the detecting of the mobility event comprises detecting, whether a cell update and/or a routing area (RA) change have occurred.

3. The method according to claim 2, wherein the detecting of the cell update and/or the RA change comprises identifying as the mobility event a parameter change on system information or cell parameters provided by a mobile network element.

4. The method according to claim 1, wherein the detecting of the downlink packet loss comprises detecting whether protocol data units are received out of sequence.

5. The method according to claim 1, wherein the indication of the occurrence of the downlink packet loss due to mobility enables the packet recovery algorithm to be started immediately upon receiving of the indication.

6. The method according to claim 1, wherein the directing transmission of the indication comprises using a particular bit in a protocol header to indicate the occurrence of the downlink packet loss due to mobility.

7. The method according to claim 1, further comprises:
directing performance of a communication with acknowledgement messages acknowledging receipt of packets in a packet transport protocol, wherein
the directing transmission of the indication comprises sending duplicate acknowledgement messages from a mobile network element.

8. The method according to claim 7, further comprising:
directing performance, in the packet transport protocol, of a communication with the acknowledgement messages acknowledging receipt of packets;
starting a recovery algorithm either after receiving the duplicate acknowledgement messages or after elapse of a predetermined time; and
deciding, based on a number of the duplicate acknowledgement messages to be sent, whether to send the duplicate acknowledgement messages or whether to wait for the predetermined time to elapse.

9. The method according to claim 1, further comprising:
using an enhanced general packet radio service (EGPRS) network as the network.

10. The method according to claim 9, wherein the method is performed in a radio link control/medium access control (RLC/MAC) layer or in a logical link control (LLC) layer.

11. The method according to claim 10, wherein the detecting of the mobility event comprises detecting cell change indications provided by upper layers as the mobility event.

12. An apparatus comprising at least one processor and at least one memory including computer program code, the at least one memory and the computer program code configured to, with the at least one processor, cause the apparatus at least to:
receive packets during a packet transfer, the packets being sent via a packet transport protocol from a sender of the packets;
detect whether a mobility event has occurred during the packet transfer;
detect whether a downlink packet loss has occurred during the packet transfer, which includes causing the apparatus to detect whether the apparatus is able to reconstruct a protocol data unit within a predetermined time; and
direct transmission, from a mobile network element to the sender of the packets, of an indication that a packet loss due to mobility has occurred in an instance in which the mobility event is detected and the downlink packet loss is detected, wherein the indication of the occurrence of the downlink packet loss due to mobility enables a packet recovery algorithm to be started in response to receiving of the indication.

13. The apparatus according to claim 12, wherein the apparatus caused to detect whether a mobility event has occurred includes being caused to detect whether a cell update and/or a routing area (RA) change as the mobility event have occurred.

14. The apparatus according to claim 13, wherein the apparatus caused to detect whether a mobility event has occurred includes being caused to identify, during detecting of the cell update and/or the RA change, a parameter change on system information or cell parameters provided by the apparatus as the mobility event.

15. The apparatus according to claim 12, wherein the apparatus caused to detect whether a downlink packet loss has occurred includes being caused to detect whether protocol data units are received out of sequence.

16. The apparatus according to claim 12, wherein the apparatus caused to direct transmission includes being caused to use a particular bit in a protocol header to indicate the occurrence of the downlink packet loss due to mobility.

17. The apparatus according to claim 12, wherein, in the packet transport protocol, communication is performed with acknowledgement messages acknowledging receipt of the packets, and wherein the apparatus caused to direct transmission includes being caused to send duplicate acknowledgement messages from the apparatus.

18. The apparatus according to claim 17, wherein, in the packet transport protocol, communication is performed with the acknowledgement messages acknowledging receipt of the packets, wherein the apparatus is further caused to start a recovery algorithm either after receiving the duplicate acknowledgement messages or after elapse of a predetermined time, and wherein the apparatus caused to direct transmission includes being caused to decide, based on a number of the duplicate acknowledgement messages to be sent, whether to send the duplicate acknowledgement messages or whether to wait for the predetermined time to elapse.

19. The apparatus according to claim 12, wherein the network is an enhanced general packet radio service (EGPRS) network.

20. The apparatus according to claim 19, wherein detecting whether a mobility event has occurred and detecting whether a downlink packet loss has occurred are implemented in a radio link control/medium access control (RLC/MAC) layer or in a logical link control (LLC) layer.

21. The apparatus according to claim 20, wherein the apparatus caused to detect whether a mobility event has occurred includes being caused to detect cell change indications provided by upper layers.

22. A system, comprising:
a mobile network element comprising:
a receiver configured to receive packets during a packet transfer, the packets being sent via a packet transport protocol from a sender of the packets,
a mobility detector configured to detect whether a mobility event has occurred during the packet transfer,
a packet loss detector configured to detect whether a downlink packet loss has occurred during the packet transfer, wherein the packet loss detector is further configured to detect whether the mobile network element is able to reconstruct a protocol data unit within a predetermined time, and
an indication provider configured to transmit, from the mobile network element to the sender of the packets, an indication that a packet loss due to mobility has occurred in an instance in which the mobility event is detected and the downlink packet loss is detected; and
the sender of the packets comprising a packet recovery device configured to start a packet recovery algorithm immediately upon receiving the indication of the occurrence of the downlink packet loss due to mobility.

23. A system, comprising:
a mobile network element comprising:
a receiver configured to receive packets during a packet transfer, the packets being sent via a packet transport protocol from a sender of the packets,
a mobility detecting means for detecting whether a mobility event has occurred during the packet transfer,
a packet loss detector configured to detect whether a downlink packet loss has occurred during the packet transfer, wherein the packet loss detector is further configured to detect whether the mobile network element is able to reconstruct a protocol data unit within a predetermined time, and an indication provider configured to transmit, from a mobile network element to the sender of the packets, an indication that a packet loss due to mobility has occurred in an instance in which the mobility event is detected and the downlink packet loss is detected, wherein the indication provider is configured to use a particular bit in a protocol header to indicate the occurrence of the packet loss due to mobility; and the sender of the packets comprising a packet recovery device configured to start a packet recovery algorithm immediately upon detecting a change in the particular bit of the protocol header.

24. A non-transitory computer-readable medium having a computer program stored therein, the computer program being configured to control a processor to perform:

detecting whether a mobility event has occurred during a packet transfer involving packets being sent from a sender of the packets to a mobile network element;

detecting whether a downlink packet loss has occurred during the packet transfer, which includes detecting whether the mobile network element is able to reconstruct a protocol data unit within a predetermined time; and directing transmission, from the mobile network element to the sender of the packets, of an indication that the downlink packet loss due to mobility has occurred in an instance in which the mobility event is detected and the downlink packet loss is detected, wherein the indication of the occurrence of the downlink packet loss due to mobility enables a packet recovery algorithm to be started in response to receiving of the indication.

25. The computer-readable medium according to claim 24, wherein the computer-readable medium stores the software code portions.

26. The computer-readable medium according to claim 24, wherein the computer program is directly loadable into an internal memory of the processor.

27. An apparatus, comprising:

receiving means for receiving packets during a packet transfer, the packets being sent via a packet transport protocol from a sender of the packets;

mobility detecting means for detecting whether a mobility event has occurred during the packet transfer;

packet loss detecting means for detecting whether a downlink packet loss has occurred during the packet transfer, wherein the packet loss detecting means includes means for detecting whether a mobile network element is able to reconstruct a protocol data unit within a predetermined time; and indication providing means for directing transmission, from the mobile network element to the sender of the packets, of an indication that a packet loss due to mobility has occurred in an instance in which the mobility event is detected and the downlink packet loss is detected, wherein the indication of the occurrence of the downlink packet loss due to mobility enables a packet recovery algorithm to be started in response to receiving of the indication.

* * * * *